May 7, 1940.  E. W. FLOSDORF  2,199,817

PRESERVATION OF BIOLOGICALLY ACTIVE SUBSTANCES

Original Filed Dec. 12, 1935

INVENTOR
Earl W. Flosdorf
BY
Pennie Davis Marvin & Edmonds
ATTORNEYS

Patented May 7, 1940

2,199,817

UNITED STATES PATENT OFFICE 2,199,817

PRESERVATION OF BIOLOGICALLY ACTIVE SUBSTANCES

Earl W. Flosdorf, Ardmore, Pa., assignor to The Trustees of the University of Pennsylvania, Philadelphia, Pa., a corporation of Pennsylvania Original application December 12, 1935, Serial No. 54,148. Divided and this application October 17, 1936, Serial No. 106,105

3 Claims. (Cl. 128—272)

This invention relates to improvements in the preservation of biologically active substances, such as sera, protein solutions, bacterial cultures, viruses, and other labile biological substances; and more particularly to an improved product, in the form of a container, containing a biologically active substance in a desiccated state, the substance being produced in a desiccated state in the container by freezing the substance, dehydrating it from the frozen state under a high vacuum, and sealing the dried product under a high vacuum, the container being provided with a novel rubber stopper which has a passage therethrough and an integral rubber tubular extension of said passage, the container being sealed by clamping off this rubber extension after the biologically active substance has been desiccated and while a vacuum is maintained within the container, by means of a metal clamp.

This application is a division of my prior application Serial No. 54,148, filed December 12, 1935, in which is described a process for the preservation of biological substances in which the biological substances in a liquid state are introduced into a final container adapted for the distribution of the product, and are rapidly and thoroughly frozen therein, and then are dehydrated by the use of a high vacuum, and sealed, after dehydration, in the containers while under a high vacuum and without destroying the vacuum under which the dehydration was effected, so that a desiccated product, sealed under the original vacuum, with maintenance of asepsis and prevention of deterioration and contamination is obtained. In the process therein described, a large number of small market containers may be simultaneously processed, and various modifications of suitable and novel containers, with the desiccated material sealed in them under the original vacuum, are described. Some of the containers are provided with a rubber stopper provided with a passage through which a glass tube may be passed, so that the application of the high vacuum, and the dehydration of the product, may be carried out by attaching the glass tube to a suitable manifold; in other suitable forms of containers, there is provided a rubber stopper having a passage, with a tubular rubber extension of the passage integral with the stopper, so that this tubular extension may be connected, as by means of a glass ube, to a vacuum manifold to permit the application of a high vacuum and the dehydration of the frozen material.

In the present application, I claim the improved containers, provided with such a rubber stopper, containing desiccated biological substances, sealed under a high vacuum by means of a metal clamp on the tubular rubber extension. The stoppers which are used are advantageously provided with a passage, in addition to the passage continuous with the tubular extension, extending part way through the stopper, which provides a perforable membrane through which sterile water can be readily introduced to restore the desiccated product to a liquid condition without destroying the vacuum until the water has been so introduced. The restoration of the product to a liquid state in this way enables the production of a restored product with assurance that the original product has not been contaminated in any way from the time the original liquid was introduced into the final container until it is ultimately restored to a liquid state. Asepsis is thus maintainable from the time the original serum or other product is inserted in the container until it is restored by the addition of sterile water. Furthermore, by the introduction of the sterile water while a vacuum is maintained within the container, the dissolution of the desiccated material is more rapid and complete than if the water is introduced after air has been permitted to enter the container, as the air tends to permeate the desiccated material, which is very porous, and to slow up or prevent the penetration of the material by the water.

It is important, in order to produce, in a final market container suitable for distribution and use, amounts of desiccated material suitable for clinical use as full individual doses or multiples thereof, and to enable the material to be advantageously processed, to maintain a proper ratio between the volume of the original serum or other material in the container and the surface area of the frozen material in contact with the container and the area of the interior surface from which the evaporation or sublimation of ice takes place. At the end of the process, the sealed container contains the desiccated product in an undisintegrated state and with practically the volume of the original liquid, and, in general, with the same or a similar ratio of volume and surface area, although the final product, because of its light and porous nature, has enormous interior surfaces.

It is also important, in order to produce clinically usable amounts of the product in the final containers, to provide exhaust tubes, for removing the water vapor from the containers, which are properly proportioned, and which are sealed at the end of the process to hold the original vacuum.

The invention will be further described in connection with specific illustrations.

*The containers.*—The containers or receptacles which are used are of a size and shape which adapt them for containing the original liquid material, for permitting freezing of this liquid in the containers and for desiccation of the frozen material, and these containers are also to serve as the final containers for storage of the dry product and for restoring the desiccated material to its original liquid state. The containers should be of a size and shape which adapts them for use both as the containers of the material during the process, and as the containers of the final product.

In size, the containers should in general be at least twice the size of the liquid serum or other material to be processed therein, so that the volume of material put into a container will not exceed about one-half the capacity of the container.

While containers as small as 2 to 5 ml. capacity are suitable and convenient for the preservation of materials in small amounts, in the case of such materials as virus suspensions or bacterial cultures, larger containers will in general be used, for example, up to containers of 50 ml. capacity for amounts of serum and similar products up to about 25 ml. in amount, which is the unit of such material generally processed in a single container for clinical use.

Larger containers can, however, be used, when desired, such as for multiple unit amounts of the product. Containers of about 200 ml. capacity, or about 8 ounces, are suitable for processing and preserving amounts of materials up to around 100 ml. In certain of its aspects, the invention includes the use of containers for desiccating volumes of as much as 100 milliliters to 1 liter or more, in a container of correspondingly increased size, since even such large containers can be effectively sealed under the original vacuum by the rubber tube sealing method of the present invention. But, in general, for clinically usable amounts of the biological materials, the individual unit will not exceed around 20 to 25 ml., and the containers need not, in general, exceed about 50 ml. capacity, when properly proportioned. For certain materials, however, such as breast milk, containers of around 200 ml. or 8 ounces capacity are suitable. Certain nursing bottles of the standard "clean easy" type, when constructed with a suitably shaped and proportioned neck, are suitable for use.

The following table shows typical container sizes, with an indication of the approximate container volume, the maximum volume of serum or other materials to be processed, and to be contained in the container, the body length, diameter and wall thickness, and the length and diameter of the necks of the containers to adapt them for the rubber stopper closures by which an effective vacuum is to be maintained in the final containers.

Table 1

| Approximate container volume | Maximum serum volume | Body length | Body outside diameter | Wall thickness | Neck length | Neck, inside diameter | |
|---|---|---|---|---|---|---|---|
| | | | | | | Large end | Small end |
| ml. | ml. | mm. | mm. | mm. | mm. | mm. | mm. |
| 100 | 50 | 185 | 35 | 2.0 | 15 | 15.2 | 13.7 |
| 50 | 25 | 110 | 28 | 1.5 | 15 | 15.2 | 13.7 |
| 25 | 13 | 80 | 22 | 1.5 | 15 | 15.2 | 13.7 |
| 12 | 6 | 60 | 20 | 1.2 | 15 | 15.2 | 13.7 |
| 6 | 3 | 45 | 15.5 | 1.0 | 15 | 15.2 | 13.7 |
| 2 | 1 | Sphere | 22 | 1.0 | 10 | 5.4 | 4.5 |
| 2 | 1 | 22 | 16 | 1.0 | 11 | 7.8 | 6.8 |

From this table it will be noted that the size and shape of the neck, which is to receive the rubber stopper, is the same for containers of considerable variations in volume. This is advantageous and it enables a standard rubber stopper to be used, and one which is of a size which enables the container to be rapidly evacuated through an opening of suitable size extending therethrough.

The shape and proportions of the containers are also important in processing and producing clinically useful amounts of the serum, etc., in the final sealed containers. For processing of the material in an effective and reliable manner, the size and shape of the containers are advantageously such that a layer of frozen material on the side of the cylindrical container while in a horizontal position, after the initial liquid is frozen, is not less than 3 mm. in thickness at the vertical diameter nor more than 15 mm.; and also such, as pointed out, that the volume of the frozen material does not exceed about one-half the volume of the container. The proper shape and proportions of the container also enable a desirable ratio to be obtained between the volume of the frozen material, during processing, the area of the frozen material in contact with the walls of the container, and the interior area of the frozen material which provides the evaporating surface during the dehydration of the frozen material. The final product, in the sealed evacuated container, will have in general the same volume and shape as that of the frozen product, although the final product will be a porous solid. In general, the ratio of the interior serum evaporating surface to the exterior surface of the frozen serum in contact with the walls of the container should be such that the evaporating surface has an area of at least about one-half that of the area of the frozen material in contact with the walls of the container. In general, also, there should be a minimum of about one to two square centimeters of internal evaporating surface per milliliter of serum frozen. These volume-area relations, which are important during the production of the product, are retained in general by the final product, even though it is no longer in a frozen condition, but instead in a light porous state.

*The container stoppers.*—For high vacuum tightness, a great compression of the rubber is necessary. This is obtained by tapering both the neck of the container and the stopper, and by lubricating the stopper before it is inserted, so that there is a maximum of compression on the entire length of the neck surface. The upper limit of compression is that which will not squeeze the holes to too small a diameter and which will not cause undue distortion of the stopper because of unequal stresses over its length. This procedure also tends to reduce the porosity of the rubber.

In inserting the stoppers in the containers, they should be first lubricated with sterile distilled water or dilute antiseptic solution, since a stopper which does not require lubrication would not in general be sufficiently tight. The rubber stock of which the stoppers are made should be a fairly pure gum stock containing some filler and an anti-oxidant to aid the stopper in withstanding heat sterilization. When the stoppers are autoclaved and sterilized before use, it is desirable to wrap them in a protective material. They should not be autoclaved while in place in the container neck since the heating of the rubber while subjected to pressure interferes with obtaining the necessary tight fit and tends to reduce its outside diameter and destroy the vacuum tightness of the fit.

Suitable sizes of rubber stoppers for use in containers such as are illustrated by Table 1 above are given in the following table:

Table 2

| No. | | Body length | Neck diameter large end | Neck diameter small end | Diameter of exhaust hole |
|---|---|---|---|---|---|
| 1 | Rubber exhaust tube-stopper. | 16.0 | 16.8 | 15.1 | 6.5 |
| 2 | Small rubber exhaust tube-stopper. | 10.0 | 9.0 | 7.5 | 4.0 |

*The exhaust tubes.*—The exhaust tubes of the rubber stoppers, which are molded integrally with the rubber stoppers must be of such character that they can be effectively sealed by means of a metal clamp with a vacuum-tight seal, and also must be sufficiently large to permit the necessary escape of water vapor during the dehydration of the frozen product. The first rubber stopper in the above table has an integral rubber tube extension about 32 mm. long, 9.5 mm. outside diameter, and 6.5 mm. inside diameter, the inside of the tube furnishing and forming an extension of the exhaust hole in the stopper itself. For containers up to about 25 cc. liquid content, a tube of about 3 mm. inside diameter is the minimum size that is satisfactory. For containers from about 25 cc. up to about 100 cc. content of frozen material, an exhaust tube having a minimum inner diameter of from 4.0 to 5.0 mm. is necessary.

Stoppers of this type may be used not only with small market containers of the kind described, but also with much larger containers, since tubes of larger diameter and of sufficient wall thickness can readily be made of soft rubber to withstand the high vacuum and to permit sufficient compression to seal the containers. For example, in sealing a container containing up to 20 or 25 litres of material, a rubber tube may be used which is as much as 2 inches in diameter internally, and with a wall thickness of about 1 inch. In this case, strong metal clamps are required for making a vacuum-tight seal, for example, steel bars which clamp together with a space between them of 1½ inches or even 1 inch, so that the soft rubber of the tubes is very highly compressed by the clamps. Rubber of a relatively soft variety should be used for such tubes.

With the small final containers, for marketing and distribution, the container may be finally sealed, at the end of the process, by compressing it sufficiently between parallel metal clamping surfaces under a sufficient pressure to hold a permanent vacuum seal on the tubing. The metal clamp must be of sufficient strength and rigidity to hold the rubber permanently compressed.

The invention will be further described in connection with the accompanying drawing, which illustrates in a somewhat conventional and diagrammatic manner, a suitable rubber stopper, and a container provided with such a rubber stopper as attached to a vacuum manifold, and a container, containing desiccated material, as finally sealed.

Figure 1:
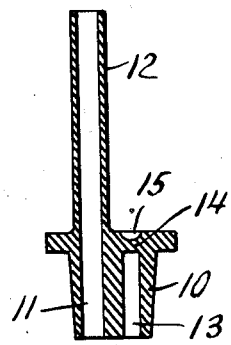
Fig. 1 is a sectional view of a suitable rubber stopper.

The rubber stopper illustrated in Fig. 1 is tapered, as shown at 10, to provide compression all along the surface of contact between it and the container, and is provided with a tubular passage 11 which is continuous with the passage of the integrally formed tubular extension 12, to form a suitable exhaust passage. The stopper is also provided with another passage 13 extending part way through it, leaving a thin section 14 through which a hypodermic needle can be inserted when it is desired to restore the product by the addition of water. A slight depression 15 may be provided above this thin section, or membrane, to facilitate locating it.

Figure 2:
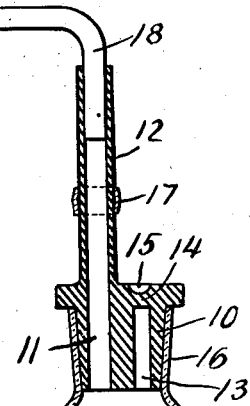
Fig. 2 is a sectional view of a container provided with the rubber stopper of Fig. 1, as attached to a vacuum manifold.

In the container shown in Fig. 2, there is provided a neck 16, which is tapered as is the rubber stopper, and with a rubber stopper such as illustrated in Fig. 1 inserted in the neck. Before inserting this stopper, a liquid biologically active substance is introduced into the container, this substance being subsequently frozen and dehydrated by the application of a vacuum. A metal ring 17 is placed over the tubular extension 12 of the rubber stopper, and a glass tube 18, which is L-shaped, is inserted in the end of the tubular extension, to permit attaching the container to a vacuum manifold. After the liquid material is introduced into the container, and the stopper and glass tube are attached thereto, the material in the container is frozen by immersing the container, preferably in a horizontal position, in a suitable freezing mixture, e. g. a freezing mixture of a temperature of —70° C. or lower, and the container is then attached to a vacuum manifold by means of the L-shaped glass tube, and the material in the container is desiccated or dehydrated by the vacuum.

Figure 3:
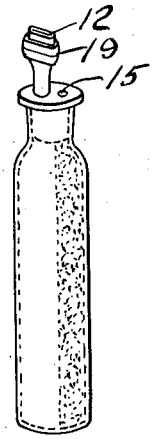
Fig. 3 is a perspective view of a final sealed container.

After the dehydration has been completed, the metal ring 17 is compressed between parallel clamping surfaces, so that it forms a metal clamp on the rubber tubular extension as shown at 19 in Fig. 3, and the rubber tubular extension is then cut off a little above this metal clamp, giving the final container illustrated in Fig. 3 with the dehydrated or desiccated material within it sealed under the original high vacuum, aseptically, and free from contamination.

The container can be further protected by coating or covering the entire exposed rubber portion with a liquid sealing cement, which retains its flexibility and imperviousness when dry, and aids in preventing deterioration of the rubber, as well as in preserving the vacuum within the container.

I claim:

1. As a new article of manufacture, a sealed evacuated container containing a solid, dry or lyophilic biologically active substance, said container having a neck and a tightly fitting rubber stopper closure for said neck to maintain the vacuum therein, said closure for said neck having an opening therethrough and an integral tubular extension, sealed by a clamp with a vacuum-tight seal, said closure permitting the passage of a tubular member for the addition of water to restore the product to a liquid state without destroying the vacuum, and the solid, dry or lyophilic biological substance therein having a volume corresponding generally to the volume of the initial liquid substance and occupying around half or somewhat less than half of the total volume of the container.

2. As a new article of manufacture, an evacuated container sealed under the original vacuum used in dehydrating the biologically active substance containing a solid, dry or lyophilic biologically active substance, said container having a neck and a tightly fitting rubber stopper closure for said neck to maintain the vacuum therein, said closure for said neck having an opening therethrough and an integral tubular extension, sealed by a clamp with a vacuum-tight seal, said closure permitting the passage of a tubular member for the addition of water to restore the product to a liquid state without destroying the vacuum, and the solid, dry or lyophilic biological substance therein having a volume corresponding generally to the volume of the initial liquid substance and occupying around half or somewhat less than half of the total volume of the container.

3. A sealed, evacuated container containing a large amount of dehydrated biologically active substance in an evacuated state, said container having a large, thick, rubber tube secured thereto with a vacuum-tight connection and said tube being compressed by a clamp to less than about half the initial thickness of the walls to maintain a high vacuum in the container.

EARL W. FLOSDORF.